United States Patent
Kizil et al.

(10) Patent No.: US 10,632,961 B2
(45) Date of Patent: Apr. 28, 2020

(54) DEFLECTION FITTING FOR SEAT BELTS IN MOTOR VEHICLES

(71) Applicant: FORD GLOBAL TECHNOLOGIES, LLC, Dearborn, MI (US)

(72) Inventors: Martin Kizil, Cologne (DE); Joerg Frank Doering, Neuss (DE); Carsten Bazant, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 11 days.

(21) Appl. No.: 16/033,720

(22) Filed: Jul. 12, 2018

(65) Prior Publication Data
US 2019/0039561 A1 Feb. 7, 2019

(30) Foreign Application Priority Data
Aug. 4, 2017 (DE) .......................... 10 2017 213 550

(51) Int. Cl.
*B60R 22/18* (2006.01)

(52) U.S. Cl.
CPC ...... *B60R 22/18* (2013.01); *B60R 2022/1818* (2013.01)

(58) Field of Classification Search
CPC ................................ B60R 22/18; B60R 22/24
See application file for complete search history.

(56) References Cited

U.S. PATENT DOCUMENTS

| 4,023,826 | A | | 5/1977 | Kokubo et al. |
| 5,673,936 | A | * | 10/1997 | Mondel ................... B60R 22/24 280/808 |
| 5,918,903 | A | * | 7/1999 | Ito .......................... B60R 22/24 280/801.1 |
| 6,279,945 | B1 | * | 8/2001 | Schneider ............... B60R 21/18 280/733 |
| 2006/0170199 | A1 | | 8/2006 | Sundararajan et al. |

FOREIGN PATENT DOCUMENTS

| DE | 10056127 A1 | 5/2002 |
| DE | 102008047822 A1 | 3/2010 |
| DE | 102013001606 A1 | 7/2014 |
| DE | 102016205068 A1 | 6/2016 |

OTHER PUBLICATIONS

English Machine Translation of DE10056127A1.
English Machine Translation of DE102008047822A1.
English Machine Translation of DE102013001606A1.
English Machine Translation of DE102016205068A1.

* cited by examiner

*Primary Examiner* — Faye M Fleming
(74) *Attorney, Agent, or Firm* — David Coppiellie; King & Schickli, PLLC

(57) ABSTRACT

A deflection fitting for a seat belt in a motor vehicle, in particular for an inflatable seat belt, includes a belt deflector which encloses the seat belt and which comprises a guide slot for receiving and for passing through the seat belt.

14 Claims, 1 Drawing Sheet

DEFLECTION FITTING FOR SEAT BELTS IN MOTOR VEHICLES

TECHNICAL FIELD

The document relates to a deflection fitting for seat belts in motor vehicles, in particular for inflatable seat belts, consisting of a belt deflector which encloses the seat belt and which comprises a guide slot for receiving and for passing through the seat belt.

BACKGROUND

Deflection fittings for seat belts are known in very different embodiments.

In the known deflection fittings there is the problem that, in the case of oblique load, the respective seat belt is folded up in the lateral regions, is thickened as a result and may cause a blockage upstream of the deflection fitting and within the deflection fitting, so that the seat belt is no longer able to be pulled correctly through the deflection fitting. This problem is critical, in particular, in inflatable seat belts.

A deflection fitting is disclosed, for example, in DE 100 56 127 A1. That deflection fitting consists of a belt guide enclosing the seat belt and a pivot bearing. The belt guide is pivotably mounted about said pivot bearing parallel to the direction of passage of the belt. So that the belt guide may be easily adjusted, even in the case of greater angular deviations of the strands, the belt guide consists of two chain links which in each case are pivotable independently of one another in the pivot bearing and which are arranged at a small distance from one another in the direction of passage of the belt. Such a deflection fitting is relatively costly and also is not suitable for inflatable seat belts.

Moreover, a belt deflector is disclosed in DE 10 2013 001 606 A1 which is also pivotably mounted, wherein the edge regions of the guide slot are enlarged to form radius-type widenings. So that the belt strap is not damaged, a resilient insert made of plastics material is arranged in the through-passage region. That insert is intended to serve for protecting the belt edges. However, such a belt deflector is not suitable for inflatable seat belts and the problems associated therewith.

SUMMARY

It is an object of this document to provide a deflection fitting, in particular for inflatable seat belts in motor vehicles, which (a) guarantees a secure guidance of a seat belt passing through, (b) is of simple construction and, in particular, (c) avoids a lateral accumulation of the seat belt so that the seat belt is not able to be twisted and become jammed and (d) also is not damaged.

According to the new and improved deflection fitting, this object is achieved in that the belt deflector comprises a plurality of flexible pressure elements which protrude into the free cross section of the guide slot and bear against the seat belt which passes through.

By this measure, a uniform and unimpeded passage of the seat belt is guaranteed by the belt deflector without it resulting in any malfunction when the seat belt passes through.

The flexible pressure elements may be arranged over the entire width of the free cross section of the guide slot.

Alternatively, however, it is also possible that the flexible pressure elements only protrude into the lateral regions of the guide slot in the free cross section thereof.

For implementing the current concept, it is sufficient if the flexible pressure elements only protrude from one transverse side of the guide slot in the free cross section thereof.

Preferably, in this case the flexible pressure elements protrude into the free cross section of the guide slot from that side of the guide slot which opposes the bearing region of the seat belt when it passes through the guide slot. By this measure it is achieved that, in particular, the wear of the pressure elements is reduced since in such an embodiment the pressure elements are not excessively subjected to pressure.

The flexible pressure elements preferably consist of bristles which bear against the seat belt.

In a preferred embodiment of the deflection fitting, the bristles protrude from the edge of the guide slot into the free cross section thereof. The bristles in this case may be fastened in holders which are fastened to the edge of the guide slot.

The bristles expediently consist of low-wear plastics material.

The bearing region of the guide slot may be curved in a concave manner, the seat belt being guided by said bearing region.

Moreover, the belt deflector may be pivotably mounted.

BRIEF DESCRIPTION OF THE DRAWING FIGURES

The deflection fitting is shown by way of example in the drawings and described hereinafter in detail using the drawings, in which.

Figure 1:
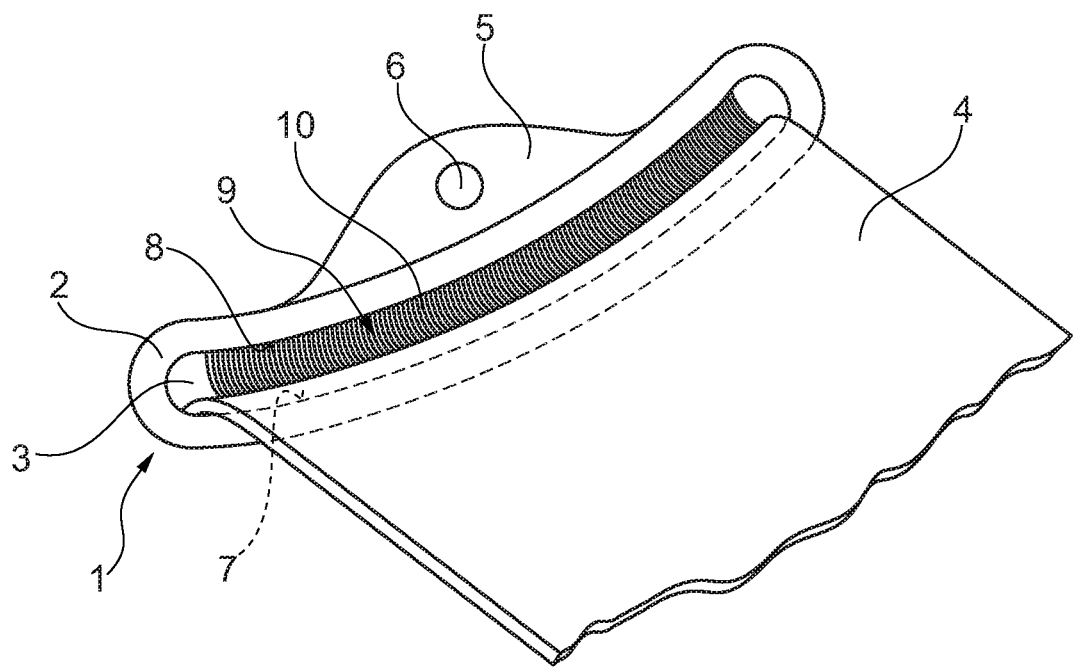
FIG. 1 shows a first embodiment of the belt deflector in a perspective view.

According to the drawings, the belt deflector 1 includes an elongated receiving part 2 which has a guide slot 3 for receiving and for passing through a seat belt 4.

The receiving part 2 is configured in the manner of a closed chain link and is optionally slightly curved over its length. On one side, the receiving part 2 is provided with a flange 5 which has a round through-opening 6 for receiving a pivot pin, not shown in the drawings. As shown in the drawings, the seat belt 4 passes over the edge 7 of the receiving part 2 located at the bottom in the drawings.

From the opposing edge 8, shown at the top in the drawings, flexible pressure elements 9 extend into the free cross section of the guide slot 3. These pressure elements 9 bear against the upper side of the seat belt 4 and force the seat belt gently against the lower edge 7 of the receiving part 2.

In the exemplary embodiment shown in FIG. 1, the flexible pressure elements 9 are arranged so as to be distributed over the entire width of the free cross section of the guide slot 3. In this exemplary embodiment, the flexible pressure elements 9 are configured in the form of a plurality of bristles 10 which are arranged over the entire width of the guide slot 3 and thus bear against the entire width of the seat belt 4 with a slight pressure. The bristles 10 in this case consist of resilient low-wear plastics material. However, it is easily possible to produce the bristles 10 from a different material, wherein the only prerequisite is that the bristles 10 are flexible. The bristles 10 may be arranged in clumps and also in a plurality of rows in succession.

Such an embodiment of a deflection fitting is extremely advantageous, in particular for inflatable seat belts, since inflatable seat belts have a variable thickness over their width. The bristles 10 bearing against the seat belt 4 may then be deformed over the width of the guide slot 3 to different degrees and yet still bear flush against the seat belt 4 over the entire width. As a result, it is ensured that the seat belt 4 does not twist and does not fold up in the edge regions, so that the seat belt 4 may pass freely and unimpeded through the belt deflector 1. The seat belt 4 is thereby effectively prevented from becoming caught in the belt deflector 1.

Figure 2:
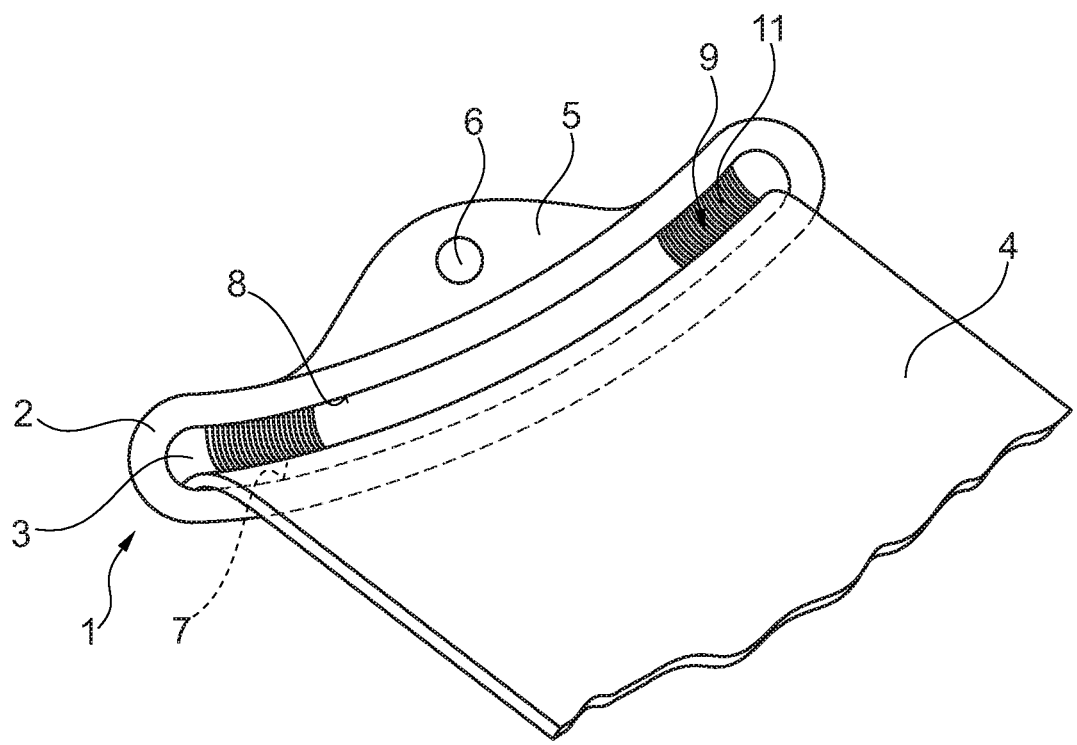
FIG. 2 shows a further exemplary embodiment of the belt deflector.

In the exemplary embodiment shown in FIG. 2, the belt deflector 1 has the same design as in the belt deflector 1 shown in FIG. 1. Also, in this case the seat belt 4 passes through the guide slot 3 provided in the receiving part 2.

In contrast to the exemplary embodiment shown in FIG. 1, however, in this case the flexible pressure elements 9 are only provided in the lateral regions of the guide slot 3, from where they protrude into the free cross section of the guide slot 3. As in the exemplary embodiment shown in FIG. 1, the pressure elements 9 may also consist of bristles 11 which, however, only bear in the critical edge regions of the seat belt 4.

In most cases which arise in daily use, the lateral arrangement of the bristles 11 is sufficient in order to guide the seat belt 4, in particular inflatable belts, safely and reliably without it resulting in the belt being laterally folded up, twisted and jammed.

What is claimed:

1. A deflection fitting for a seat belt, comprising:
a belt deflector including a guide slot for receiving and for passing through the seat belt, wherein the belt deflector comprises a plurality of flexible pressure elements which protrude into a free cross section of the guide slot and bear against the seat belt which passes through and wherein a bearing region of the guide slot is curved in a concave manner, the seat belt being guided by said bearing region.

2. The deflection fitting as claimed in claim 1, wherein the flexible pressure elements are arranged over an entire width of the free cross section of the guide slot.

3. The deflection fitting as claimed in claim 1, wherein the flexible pressure elements only protrude into the lateral regions of the guide slot in the free cross section thereof.

4. The deflection fitting as claimed in claim 1, wherein the flexible pressure elements only protrude from one transverse side of the guide slot in the free cross section thereof.

5. The deflection fitting as claimed in claim 4, wherein the flexible pressure elements protrude into the free cross section of the guide slot from that transverse side of the guide slot which opposes a bearing region of the seat belt when it passes through the guide slot.

6. The deflection fitting as claimed in claim 1, wherein the flexible pressure elements are bristles.

7. The deflection fitting as claimed in claim 6, wherein the bristles protrude from an edge of the guide slot into the free cross section of the guide slot.

8. The deflection fitting as claimed in claim 7, wherein the bristles include low-wear plastics material.

9. The deflection fitting as claimed in claim 1, wherein the belt deflector is pivotably mounted.

10. A deflection fitting for a seat belt, comprising:
a belt deflector including a guide slot for receiving and for passing through the seat belt, wherein the belt deflector comprises a plurality of bristles which protrude into a free cross section of the guide slot and bear against the seat belt which passes through.

11. The deflection fitting as claimed in claim 10, wherein the bristles protrude from an edge of the guide slot into the free cross section of the guide slot.

12. The deflection fitting as claimed in claim 11, wherein the bristles include low-wear plastics material.

13. The deflection fitting as claimed in claim 12, wherein a bearing region of the guide slot is curved in a concave manner, the seat belt being guided by said bearing region.

14. The deflection fitting as claimed in claim 13, wherein the belt deflector is pivotably mounted.

* * * * *